United States Patent [19]

Heinzl et al.

[11] Patent Number: 5,564,063
[45] Date of Patent: Oct. 8, 1996

[54] METHOD FOR MANUFACTURE OF AT LEAST ONE MICRONOZZLE IN AN AEROSTATIC BEARING

[75] Inventors: Joachim Heinzl, Dreiseselbergstrasse 16, D-81549 München; Michael Muth; Bernd Schulz, both of München, all of Germany

[73] Assignee: Joachim Heinzl, Munich, Germany

[21] Appl. No.: 382,727

[22] Filed: Feb. 2, 1995

[30] Foreign Application Priority Data

Feb. 3, 1994 [DE] Germany ............... 44 03 340.0

[51] Int. Cl.⁶ ..................................... B22F 7/00
[52] U.S. Cl. .................. 419/2; 419/5; 419/6; 419/7; 419/8; 419/9; 419/43; 419/66; 427/457; 427/523
[58] Field of Search ................ 428/550; 419/2, 419/5, 6, 7, 8, 9, 43, 66; 427/457, 523; 308/9

[56] References Cited

U.S. PATENT DOCUMENTS

| | | | |
|---|---|---|---|
| 2,187,755 | 1/1940 | Ryder | 29/898.12 |
| 3,169,807 | 2/1965 | Abel et al. | 308/9 |
| 3,645,589 | 2/1972 | Bird | 308/9 |
| 4,005,914 | 2/1977 | Newman | 308/9 |
| 4,140,592 | 2/1979 | Orlando | 204/56 R |
| 4,323,401 | 4/1982 | Belke et al. | 148/39 |
| 4,735,682 | 4/1988 | Heinzl et al. | 128/550 |
| 5,031,559 | 6/1991 | Bartholomew | 114/67 A |
| 5,072,092 | 12/1991 | Richter et al. | 219/121.72 |
| 5,110,520 | 5/1992 | Miyazaki et al. | 264/40.3 |
| 5,407,280 | 4/1995 | Heinzl et al. | 384/12 |

FOREIGN PATENT DOCUMENTS

| | | |
|---|---|---|
| 3110712 | 8/1986 | European Pat. Off. . |
| 0237627 | 9/1987 | European Pat. Off. . |
| 2324425 | 8/1976 | France . |
| 3230232 | 2/1984 | Germany . |
| 3439648 | 5/1986 | Germany . |
| 3291188 | 12/1991 | Japan . |
| 1263054 | 1/1992 | United Kingdom . |

Primary Examiner—Charles T. Jordan
Assistant Examiner—Anthony R. Chi
Attorney, Agent, or Firm—Anderson, Kill & Olick P.C.

[57] ABSTRACT

A method for manufacture of at least one micronozzle in an aerostatic bearing, wherein at least one hole is placed into a compacted bearing surface from porous sintered material by means of a laser beam and disposed so as to be distributed across the surface. The holes distributed across the compacted bearing surface constitute micronozzles of an aerostatic bearing.

6 Claims, 2 Drawing Sheets

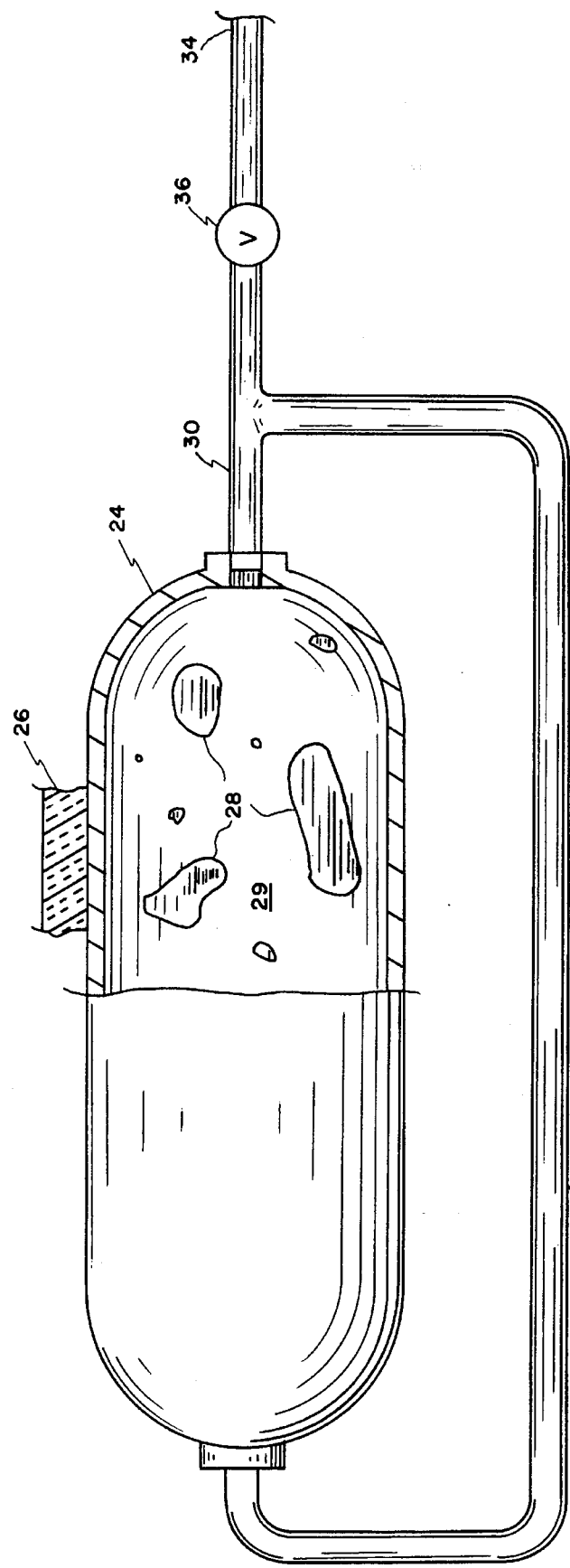

METHOD FOR MANUFACTURE OF AT LEAST ONE MICRONOZZLE IN AN AEROSTATIC BEARING

FIELD OF THE INVENTION

The present invention deals with a method for manufacturing at least one micronozzle in an aerostatic bearing.

BACKGROUND OF THE INVENTION

Aerostatic bearings with micronozzles distributed across their surface are distinguished by a high bearing or load capacity and stiffness, by a good damping behavior, and thus, with a large stability range as well as a low noise level operation. The static properties can be achieved by the area distribution of the micronozzles adjusted or equalized to a predetermined flow resistance, which results in a uniformly high pressure in the bearing gap. Good dynamic properties result if one succeeds in locating the narrowest throttling point of the micronozzles directly at the outlet point into the bearing gap. The low noise level operation results from the capillary effect of the throttling points.

Hitherto, such bearings were manufactured according to DE-PS 34 39 648 by using sintered material, for instance, sintered bronze, as bearing material for at least one of the two bearing faces. An arrangement of the sintered round pellets, approximately the densest pellet package during spreading or distribution, is used as the bearing face. These surfaces are then compacted by rolling, wherein the rolling geometry is selected, in such a way, that only the uppermost pellets or ball layers are plastically deformed. Narrow residual gaps are formed in between respectively three pellets on the uppermost pellet layer due to the spring back phenomenon. By removal of the top half of the uppermost pellet layer, for instance, by diamond cutters, it is achieved to make these residual gaps effective as throttling points directly at the bearing surface. This process is, however, very difficult to control, especially if one wants to set up specific flow resistances of the throttle layer and attempts to achieve a uniform distribution of the throttling points across the bearing surface.

In U.S. Pat. No. 5,110,520 micronozzles distributed across the surface are produced by sealing the sintered porous bearing surface with plastic spray and subsequently opening same again at individual locations by targeted etching.

In DE-PS 32 30 232, a sintered bearing surface is also compacted and subsequently opened to such an extent by etching, that the desired throttling effect is achieved.

SUMMARY OF THE INVENTION

It is the task of the present invention to eliminate disadvantages of known bearings and to further optimize the bearing properties with simple means and processes.

This task is solved by the method of the present invention, which is directed to a method for the manufacture of at least one micronozzle in an aerostatic bearing characterized in that at least one hole is placed into one bearing surface by means of a beam rich in energy for forming the micronozzle.

The advantages of the present invention are seen, above all, in that any random flow resistances can be simply adjusted in the bearing layer during the placing of the hole by controlling the laser beam. Further, the compaction of the bearing faces by rolling can be used to process the bearing surface to the desired form tolerance and surface tolerance, without, at the same time, having to pay attention to the flow resistance.

Non-uniform distributions of the micronozzles in the bearing surface can also be produced, in order to adapt the bearing to specific loads.

The methods proposed are so simple that an automated fabrication in series becomes possible and with this the manufacturing costs can be lowered to such an extent, that wide commercial use of the bearings is made possible.

Accordingly, it is an object of the present invention to provide a method for manufacture of at least one micronozzle in an aerostatic bearing, wherein any random flow resistance can be simply adjusted in the bearing layer during a placing of the hole by controlling the laser beam.

It is another object of the present invention to provide a method for manufacture of at least one micronozzle in an aerostatic bearing, wherein the compaction of the bearing faces by rolling can be used to process the bearing surface to the desired form-tolerance and surface-tolerance, without, at the same time, having to pay attention to the flow resistance.

It is yet another object of the present invention to provide a method for manufacture of at least one micronozzle in an aerostatic bearing, wherein non-uniform distributions of the micronozzles in the bearing surface can also be produced, in order to adapt the bearing to specific loads.

It is still another object of the present invention to provide a method for manufacture of at least one micronozzle in an aerostatic bearing, wherein an automated fabrication in series becomes possible, and with this, manufacturing costs can be lowered to such an extent that wide commercial use of the bearings is made possible.

Other objects and advantages of the present invention will be made apparent to those persons skilled in the art after a review of the Description of the Preferred Embodiment taken in conjunction with the Drawings which follow:

DESCRIPTION OF THE PREFERRED EMBODIMENT

Figure 1:
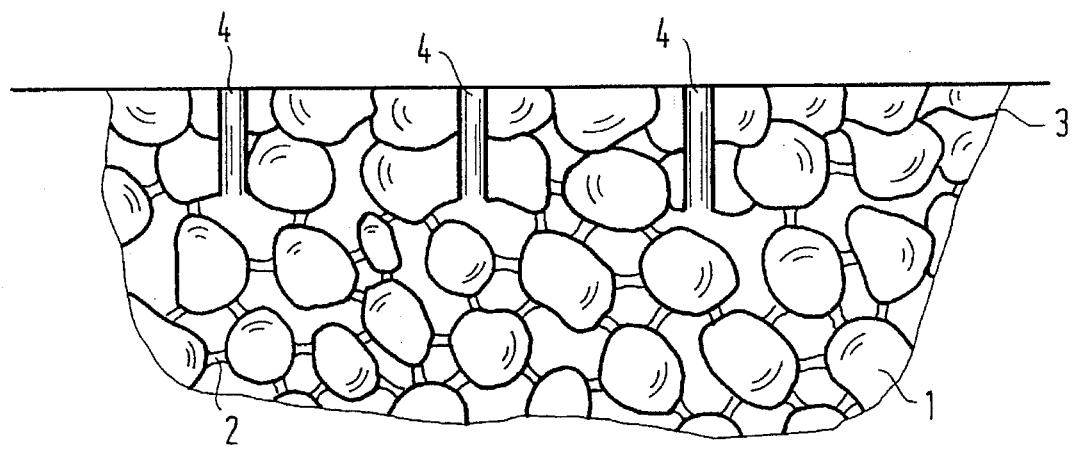
FIG. 1 illustrates an aerostatic bearing whose surface has been compacted by rolling.

FIG. 1 illustrates a cutout from a planar aerostatic bearing, wherein the bearing surface 3 has been compacted by rolling precisely to such an extent that the holes, which constitute the micronozzles 4, can be placed into the bearing surface 3 by subsequent drilling with a laser beam. The bearing surface 3 consists of a porous sintered material, into which the micronozzles 4 have been placed so as to be distributed across the surface. By rolling the bearing surface 3 of the porous sintered material, its surface is compacted up to a high resistance to flow. The depth of the micronozzles 4 has been selected in the example so that said micronozzles 4 reach into the non-compacted or only slightly compacted sintered material. The sintered material consists, in a known manner, of sintered pellets 1 and connector webs 2.

Figure 2:
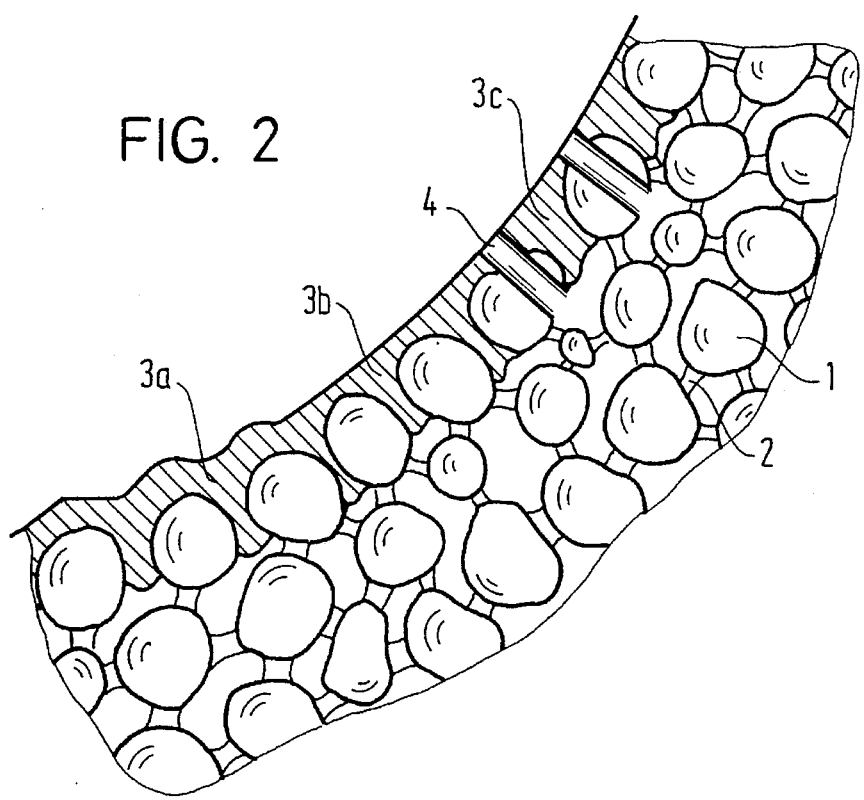
FIG. 2 illustrates an aerostatic bearing, whose bearing surface was coated by electroplating.

FIG. 2 illustrates a cutout from a spherical type aerostatic bearing, whose bearing surface 3 has been coated by electroplating. Here also the basic member of the bearing consists of a porous sintered material with sintered round pellets 1 and connecting webs 2. The area 3a of the bearing surface 3 is shown in the unprocessed or unmachined state. The area 3b shows the bearing surface 3 after a cutting-type machining operation, wherein the cover layer was brought to the required shape-tolerance and surface-tolerance. Another area of the bearing surface 3 which is denoted by the reference numeral 3c is shown, wherein the micronozzles 4 are already in place. The placing of the micronozzles 4 was done by means of a laser beam.

Coating of the bearing surface 3 can also be performed by metal spraying or laser sintering.

Figure 3:
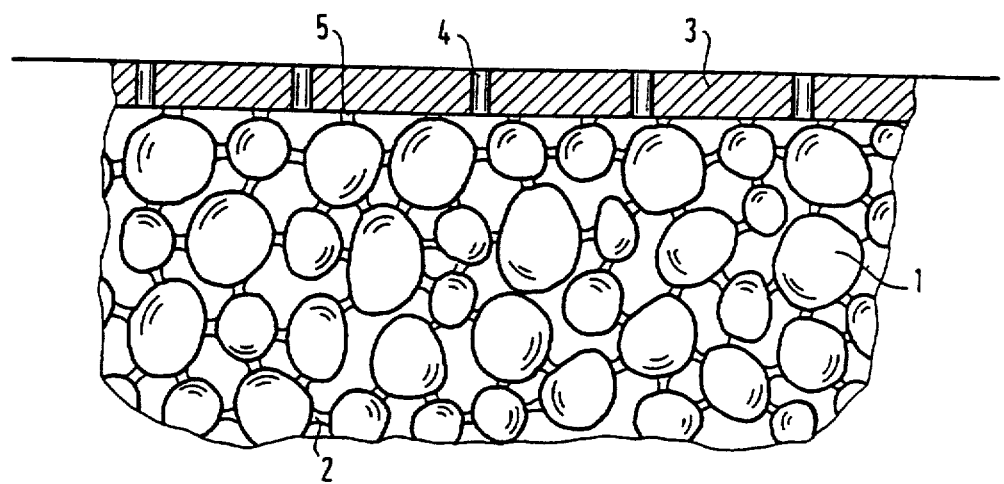
FIG. 3 illustrates an aerostatic bearing wherein the bearing surface is formed by a metal foil.

Another embodiment example which is illustrated in FIG. 3 illustrates a cutout from a planar aerostatic bearing wherein the bearing surface 3 is formed by a metal foil. The bearing member consists, as in the previous example, of sintered material 1, 2. In the course of sintering this bearing member the metal foil 3 is placed into the sintering mold, which connects during the sintering process with the sintered material by means of connector webs 5, thus forming the coated bearing surface 3. The micronozzles 4 are placed into this metal foil 3 by means of a laser beam.

Figure 4:
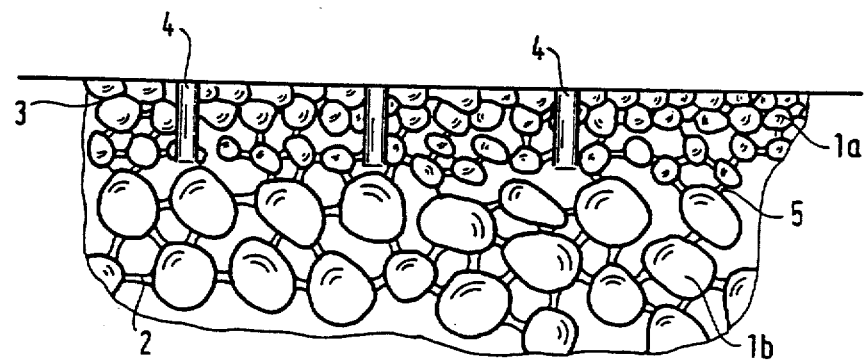
FIG. 4 illustrates an aerostatic bearing, wherein the bearing surface is formed by a layer from finer sintered material.

FIG. 4 illustrates a cutout from a planar aerostatic bearing, wherein the bearing surface 3 is formed by a layer of finer sintered material 1a. This layer is connected by means of connector webs 5 with the basic member. The basic member of the bearing consists of a coarser sintered material with sintered pellets 1b and connector webs 2. In case of adequate throttling effects of the layer from the finer sintered material 1a, the compaction process can be selectively eliminated. The micronozzles 4 are placed by means of a laser beam into this layer.

In all of these embodiment examples, the bearing surface 3 can be planar, spherical or curved at will. The bearing fabricated according to the present invention can also consist of only one single micronozzle 4. A laser beam is preferred for placing the at least one hole 4 into the bearing. However, another beam rich in energy, for instance, an electron beam can be used. It is further particularly advantageous, that the laser beam be operated in a pulsed manner and that an air jet or a similar flushing gas be directed on the hole 4 in the course of its manufacture or that formation of a seam or burr at the edge of the hole 4 is prevented by an aspirating process or a sucking-away process.

Further, it is advantageous if the compacted and/or coated bearing surface 3 is machined to the form tolerance required for the bearing prior to placing the micronozzle 4 therein. Additionally, it is possible to process or machine the bearing to the surface accuracy required for the bearing after application of the micronozzle 4.

While the present invention has been described and illustrated in various preferred embodiments, such descriptions are merely illustrative of the present invention and are not to be construed to be limitations thereof. In this regard, the present invention encompasses all modifications, variations and/or alternate embodiments with the scope of the present invention limited only by the claims which follow.

What is claimed is:

1. A method of manufacturing of micronozzles in an aerostatic bearing having a bearing surface formed of a porous sintered material, said method comprising the steps of:

machining the bearing surface to predetermined form tolerances;

compacting the bearing surface by rolling to provide for an increased resistance to material flow;

thereafter, forming a plurality of holes in the bearing surface with a later beam; and thereafter, machining the bearing surface to predetermined surface tolerances.

2. A method according to claim 1, wherein said holes forming step comprises the step of forming the plurality of holes with a pulsed laser beam.

3. A method according to claim 1, comprising the step of coating the bearing surface by one of electroplating, metal spraying and laser sintering.

4. A method according to claim 1, comprising the step of forming a bearing body by sintering, with introducing into a sintering mold a metal foil, so that the metal foil binds to sintering material forming a bearing surface coating.

5. A method to claim 1, further comprising the step of one of compacting the bearing surface and forming a coating thereon before machining the bearing surface to the form tolerances.

6. A method according to claim 1, comprising the step of forming a bearing body by sintering, with introducing into a sintering mold a layer of fine sintered material which forms the bearing surface.

\* \* \* \* \*

UNITED STATES PATENT AND TRADEMARK OFFICE
CERTIFICATE OF CORRECTION

PATENT NO. : 5,564,063

DATED : October 8, 1996

INVENTOR(S) : Joachim Heinzl

It is certified that error appears in the above-identified patent and that said Letters Patent is hereby corrected as shown below:

In The Drawing Figure 3 should be deleted and substituted with the attached Figures 3 and 4.

Signed and Sealed this

Twenty-first Day of January, 1997

Attest:

BRUCE LEHMAN

Attesting Officer     Commissioner of Patents and Trademarks